United States Patent
Cho et al.

(10) Patent No.: US 9,946,420 B2
(45) Date of Patent: Apr. 17, 2018

(54) TOUCH SCREEN PANEL AND METHOD FOR MANUFACTURING THE SAME

(71) Applicant: Samsung Display Co., Ltd., Yongin-si (KR)

(72) Inventors: Sun Haeng Cho, Yongin-si (KR); Jae Neung Kim, Yongin-si (KR); Sung Kyun Park, Yongin-si (KR); Sang Kyu Choi, Yongin-si (KR); Kyung Seop Kim, Yongin-si (KR); Ki Hyun Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 98 days.

(21) Appl. No.: 14/980,365

(22) Filed: Dec. 28, 2015

(65) Prior Publication Data
US 2016/0306475 A1 Oct. 20, 2016

(30) Foreign Application Priority Data
Apr. 20, 2015 (KR) .......................... 10-2015-0055384

(51) Int. Cl.
*G06F 3/041* (2006.01)
*G06F 3/044* (2006.01)

(52) U.S. Cl.
CPC .... *G06F 3/044* (2013.01); *G06F 2203/04103* (2013.01)

(58) Field of Classification Search
None
See application file for complete search history.

(56) References Cited

U.S. PATENT DOCUMENTS

| 9,582,087 | B2 | 2/2017 | Kang | |
|---|---|---|---|---|
| 2012/0146922 | A1* | 6/2012 | Kang | G06F 3/044 345/173 |
| 2014/0198266 | A1 | 1/2014 | Park et al. | |
| 2014/0152588 | A1 | 6/2014 | Kang et al. | |

(Continued)

FOREIGN PATENT DOCUMENTS

| KR | 1020130070729 | 6/2013 |
|---|---|---|
| KR | 1020140008685 | 1/2014 |
| KR | 1020140016070 | 2/2014 |

(Continued)

*Primary Examiner* — Khaja Ahmad
(74) *Attorney, Agent, or Firm* — H.C. Park & Associates, PLC

(57) ABSTRACT

A touch screen panel includes a substrate including an active area, a non-active area at the periphery of the active area, and a contact area between the active area and the non-active area, sensing electrodes disposed in the active area, connecting lines disposed in the non-active area and the contact area and electrically connected to the sensing electrodes, and a metal capping layer disposed in the contact area, in which the sensing electrodes include a first overcoating layer disposed on the substrate as a conductor layer, and a second overcoating layer disposed on the first overcoating layer, the connecting lines include the first overcoating layer, the second overcoating layer, and a metal line layer disposed on the second overcoating layer, and the metal capping layer couple the metal line layer to the first overcoating layer through a contact hole to expose the first overcoating layer in the contact area.

11 Claims, 8 Drawing Sheets

(56) References Cited

U.S. PATENT DOCUMENTS

2014/0253495 A1  9/2014 Kang et al.
2014/0308524 A1  10/2014 Shim et al.

FOREIGN PATENT DOCUMENTS

| KR | 10-2014-0066441 | 6/2014 |
| KR | 1020140070106 | 6/2014 |
| KR | 1020140076472 | 6/2014 |
| KR | 1020140092683 | 7/2014 |
| KR | 1020140110270 | 9/2014 |

* cited by examiner

TOUCH SCREEN PANEL AND METHOD FOR MANUFACTURING THE SAME

CROSS-REFERENCE TO RELATED APPLICATION

This application claims priority from and the benefit of Korean Patent Application No. 10-2015-0055384, filed on Apr. 20, 2015, which is hereby incorporated by reference for all purposes as if fully set forth herein.

BACKGROUND

Field

Exemplary embodiments relate to a touch screen panel and a method for manufacturing the same. More particularly, exemplary embodiments relate to a touch screen panel having high flexibility and high reliability and a method for manufacturing the same.

Discussion of the Background

A touch screen panel is an input device, through which a user's instruction may be input with the user's hand or an object, by selecting an instruction content displayed on a screen of a display device or the like. A touch screen panel may replace a separate input device connected to an image display device, such as a keyboard or mouse, and thus, application fields thereof may have been gradually extended.

Touch screen panels may be divided into a resistive film type, an optical sensing type, a capacitance type, and the like. The capacitance type may be divided into a self-capacitance type and a mutual capacitance type. The self-capacitance type may implement hovering and multi-touch functions. In the self-capacitance type touch screen panel, conductive sensing electrodes separated from each other may be formed on one surface of a substrate, and each of the conductive sensing electrodes may correspond to specific position information. As such, when a user's hand or object is contacted with the touch screen panel, a change in capacitance of the sensing electrode may be detected, thereby calculating a contact position. A conventional self-capacitance type touch screen panel may include electrode lines. Each of the electrode lines may be arranged between the sensing electrodes and connected to corresponding sensing electrodes.

In a touch screen panel, sensing electrodes may be formed by using a hybrid layer made of metal nanoparticles (e.g., silver nanowire (AgNW)) or a conductive transparent oxide (e.g., indium tin oxide (ITO)), and metal lines and bridges may be formed by using a metal, such as copper (Cu). A passivation layer may be formed over the sensing electrodes, the metal lines, and the bridges. However, due to a high moisture permeability at a pad portion and a fan-out portion of the passivation layer, the copper metal line therein may be corroded. In addition, in a high-flexibility device, copper may not have sufficient flexibility, such that cracks may be generated in the metal line and the resistance thereof may increase. High-flexibility materials, such as aluminum (Al), may be used instead of copper, however, process defects, such as lifting of an aluminum layer, may occur during the manufacturing process of the touch screen panel.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch screen panel having high flexibility and high reliability a manufacturing method of the same.

Additional aspects will be set forth in the detailed description which follows, and, in part, will be apparent from the disclosure, or may be learned by practice of the inventive concept.

An exemplary embodiment discloses a touch screen panel including a substrate including an active area, a non-active area at the periphery of the active area, and a contact area between the active area and the non-active area, sensing electrodes disposed in the active area, connecting lines disposed in the non-active area and the contact area and electrically connected to the sensing electrodes, and a metal capping layer disposed in the contact area, in which the sensing electrodes include a first overcoating layer disposed on the substrate as a conductor layer, and a second overcoating layer disposed on the first overcoating layer, the connecting lines include the first overcoating layer, the second overcoating layer, and a metal line layer disposed on the second overcoating layer, and the metal capping layer couples the metal line layer to the first overcoating layer through a contact hole to expose the first overcoating layer in the contact area.

An exemplary embodiment further discloses a method for manufacturing a touch screen panel including forming a first overcoating layer including a conductive material on a substrate, the substrate including an active area, a non-active area at the periphery of the active area, and a contact area between the active area and the non-active area, forming a second overcoating layer on the first overcoating layer, forming sensing electrodes in the active area and connecting lines in the non-active area and the contact area by patterning the first overcoating layer and the second overcoating layer, forming a metal line layer on the second overcoating layer corresponding to the connecting lines in the non-active area and the contact area, forming a contact hole to expose the first overcoating layer in the contact area, and forming a metal capping layer in the contact hole, in which the metal capping layer couples the metal line layer to the first overcoating layer through the contact hole in the contact area.

In the touch screen panel according an exemplary embodiment, a capping layer may be formed over a metal line under a high-temperature and high-humidity environment, thereby improving reliability. Also, a second overcoating layer is formed at an upper portion of an active area to prevent oxidation of the first overcoating layer formed of a conductor, thereby further improving reliability. In addition, a conductive oxide layer may not be formed in the active area, which may improve optical properties of the touch screen panel.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
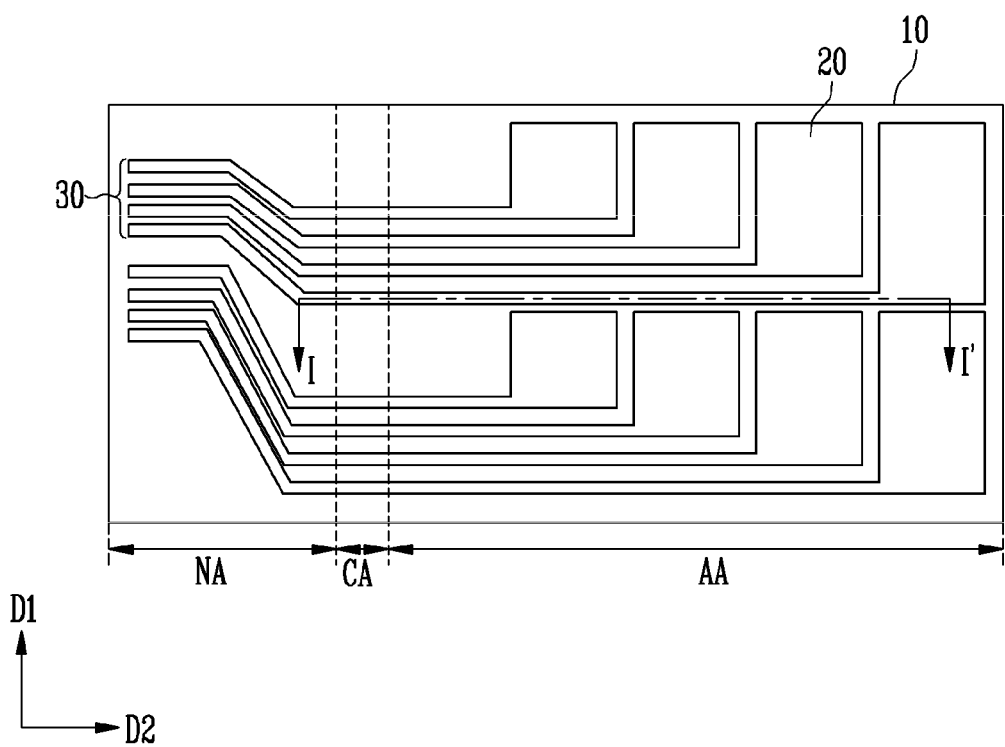
FIG. 1 is a plan view of a touch screen panel according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
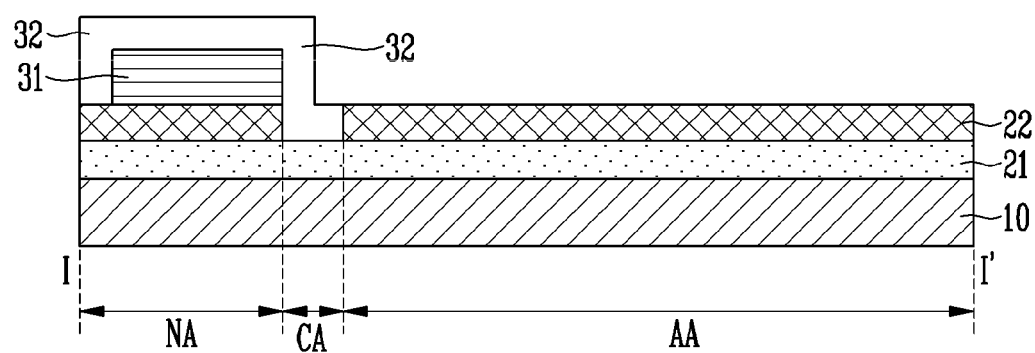
FIG. 2 is a sectional view taken along line I-I' of the touch screen panel of FIG. 1.

FIG. 1 is a plan view of a touch screen panel according to an exemplary embodiment. FIG. 2 is a sectional view taken along line I-I' of the touch screen panel of FIG. 1. FIG. 3A, FIG. 3B, FIG. 3C, FIG. 3D, and FIG. 3E are a process view illustrating a manufacturing process of the touch screen panel of FIG. 1.

Referring to FIG. 1, FIG. 2, FIG. 3A, FIG. 3B, FIG. 3C, FIG. 3D, and FIG. 3E, a touch screen panel according to the present exemplary embodiment includes a substrate 10 divided into an active area AA, a non-active area NA at the periphery of the active area AA and a contact area CA between the active area AA and the non-active area NA, sensing electrodes 20, and connecting lines 30 electrically connected to the sensing electrodes 20.

The touch screen panel according to the present exemplary embodiment may be applied in a display device such as a liquid crystal display device or an organic light emitting display device.

The substrate 10 is divided into the active area AA, on which an image is displayed, the non-active area NA at the periphery of the active area AA, and the contact area CA between the active area AA and the non-active area NA. The active area AA may be an area detecting a touch position and displaying an image. Accordingly, the active area AA may overlap pixels provided in a display panel (not shown) disposed below the touch screen panel. The non-active area NA may be a non-display area, on which no image is displayed. The sensing electrodes 20 may be disposed in the active area AA, and the connecting lines 30 may be disposed in the non-active area NA.

The substrate 10 may include a transparent material having high thermal resistance and chemical resistance. According to an exemplary embodiment, the substrate 10 may have flexibility. For example, the substrate 10 may be a thin film substrate formed of at least one of polyethylene terephthalate (PET), polycarbonate (PC), acryl, polymethyl methacrylate (PMMA), triacetyl cellulose (TAC), polyethersulfone (PES), and polyimide (PI). In addition, generally used glass or tempered glass may be utilized as the substrate 10.

The sensing electrodes 20 on the substrate 10 may be conductive patterns, and may be uniformly distributed and arranged in the active area AA of the substrate 10.

The touch screen panel according to the present exemplary embodiment may be a self-capacitance type, and has a structure in which the sensing electrodes 20 are electrically connected to the corresponding connecting lines 30, respectively. The connecting lines 30 extend to a fan-out portion passing through the active area AA and the contact area CA and a pad portion in the non-active area NA.

The sensing electrodes 20 may be quadrangular patterns arranged in a lattice structure. However, the shape of the sensing electrode 20 may vary, including a polygon such as a diamond, a triangle, or a hexagon, a circle, an ellipse, and the like.

Figure 3A:
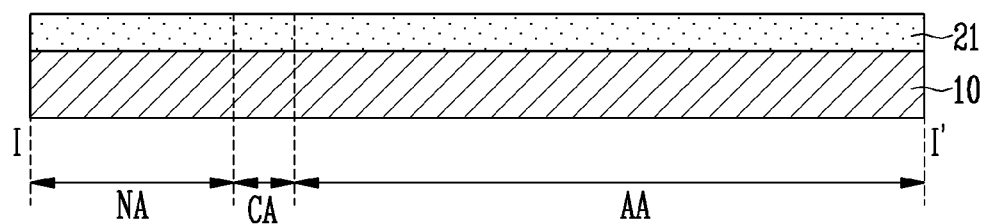
FIG. 3A, FIG. 3B, FIG. 3C, FIG. 3D, and FIG. 3E are a process view illustrating a manufacturing process of the touch screen panel of FIG. 1.
Figure 3B:
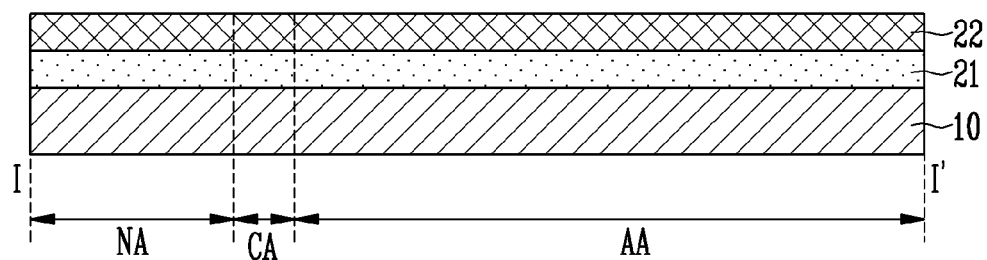

Referring to FIGS. 3A and 3B, the sensing electrodes 20 according to the present exemplary embodiment are formed by forming a first overcoating layer 21 on the substrate 10 by using a conductive material, forming a second overcoating layer 22 on the first overcoating layer 21 by using an insulating material, and then patterning the first and second overcoating layers 21 and 22 through wet or dry etching. Here, a metal nanowire, such as a silver nanowire (AgNW) may be used as the conductive material of the first overcoating layer 21. The thickness of the first overcoating layer 21 may have a normal range in the art.

An acrylic- or silicone-based monomer may be used as the insulating material of the second overcoating layer 22, and the thickness of the second overcoating layer 22 may be in a range of about 50 nm to about 5 µm. The second overcoating layer 22 may be capped in the active area AA to increase reliability.

The connecting lines 30 in the non-active area AA are formed by forming a first overcoating layer 21 on the substrate 10 by using the conductive material, forming a second overcoating layer 22 on the first overcoating layer 21 by using the insulating material, forming a metal line layer 31 on the second overcoating layer 22, forming a metal capping layer 32 over the metal line layer 31, and then patterning the metal capping layer 32 through dry etching.

The first overcoating layer 21 and the second overcoating layer 22 in the non-active area NA, as shown in FIGS. 3A and 3B, are deposited and patterned through the same process as the first overcoating layer 21 and the second overcoating layer 22 in the active area AA. Thus, the first overcoating layer 21 and the second overcoating layer 22 in the non-active area NA are patterned as the connecting lines 30.

Figure 3C:
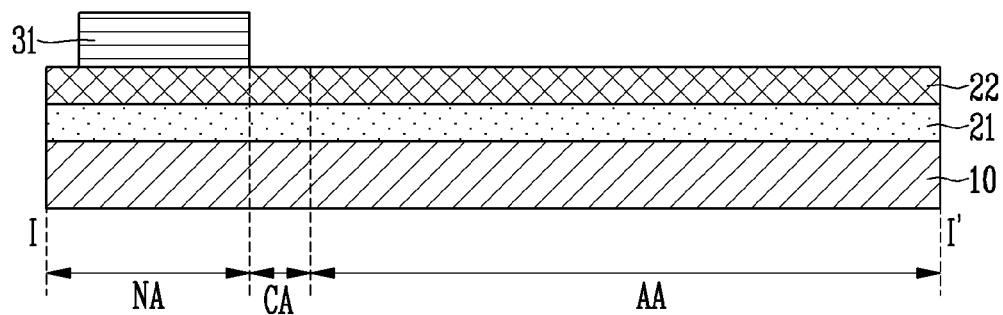

Referring to FIG. 3C, the connecting line 30 in the non-active area NA may then be formed by disposing a metal line layer 31, such as copper or aluminum, on the second overcoating layer 22. Aluminum may be a wiring metal that may have highly flexibility at an upper portion thereof. The thickness of the aluminum may be about 500 Å to 2000 Å. Aluminum may be generally known to have excellent bending properties, even when applied to a high flexibility device that may be folded. However, aluminum may be vulnerable in a manufacturing process and in selective etching of a conductor layer, such as silver nanowire (AgNW). According to the present exemplary embodiment, the sensing electrodes 20 may include the second overcoating layer 22, an thus, the aluminum may be used without causing defects such as lifting.

Figure 3D:
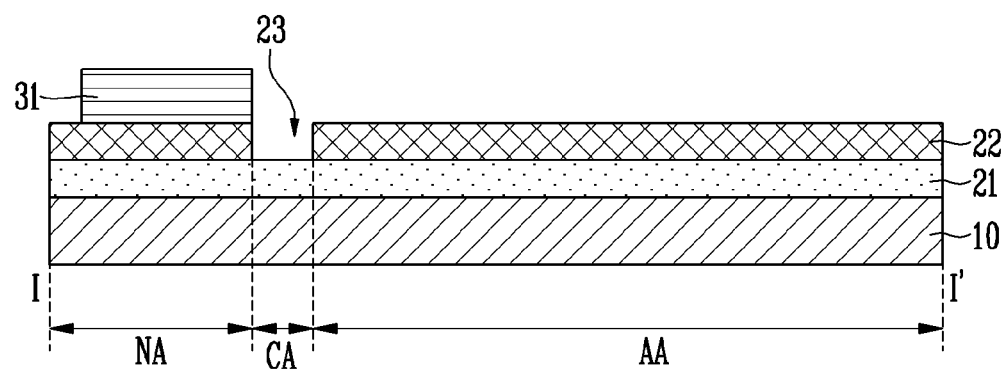

Referring to FIG. 3D, a contact hole 23 is then formed in the contact area CA between the active area AA and the non-active area NA, by etching the second overcoating layer 22 on the substrate 10. In this case, a halftone mask may be used.

Figure 3E:
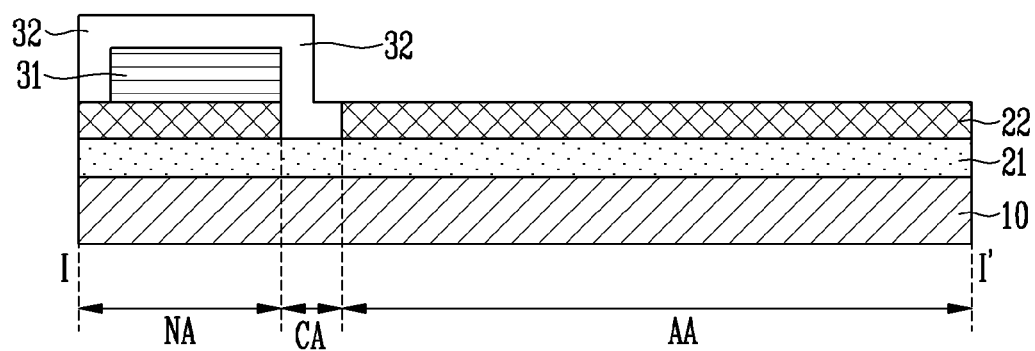

Referring to FIG. 3E, a metal capping layer 32 is then formed over the contact hole 23 and the metal line layer 31, more particularly, over the metal line layer 31 corresponding to the pad portion, so as to provide reliability to the contact hole 23 and the metal line layer 31. The metal capping layer 32 may have a thickness of about 500 Å or more, more particularly, a thickness of about 500 Å to 700 Å, by using indium tin oxide (ITO) or titanium (Ti) based corrosion resistance alloy. The metal capping layer 32 may couple the metal line layer 31 to the first overcoating layer 21 through the contact hole 23.

According to the structure of the touch screen panel described above, when a contact object, such as a user's finger or touch stick, contacts the touch screen panel, a change in capacitance based on a contact position may be transmitted to a driving circuit via the sensing electrodes 20, the connecting lines 30, and the pad portion (not shown). The change in capacitance may be converted into an electrical signal by X and Y input processing circuits (not shown), thereby detecting the contact position.

Figure 4:
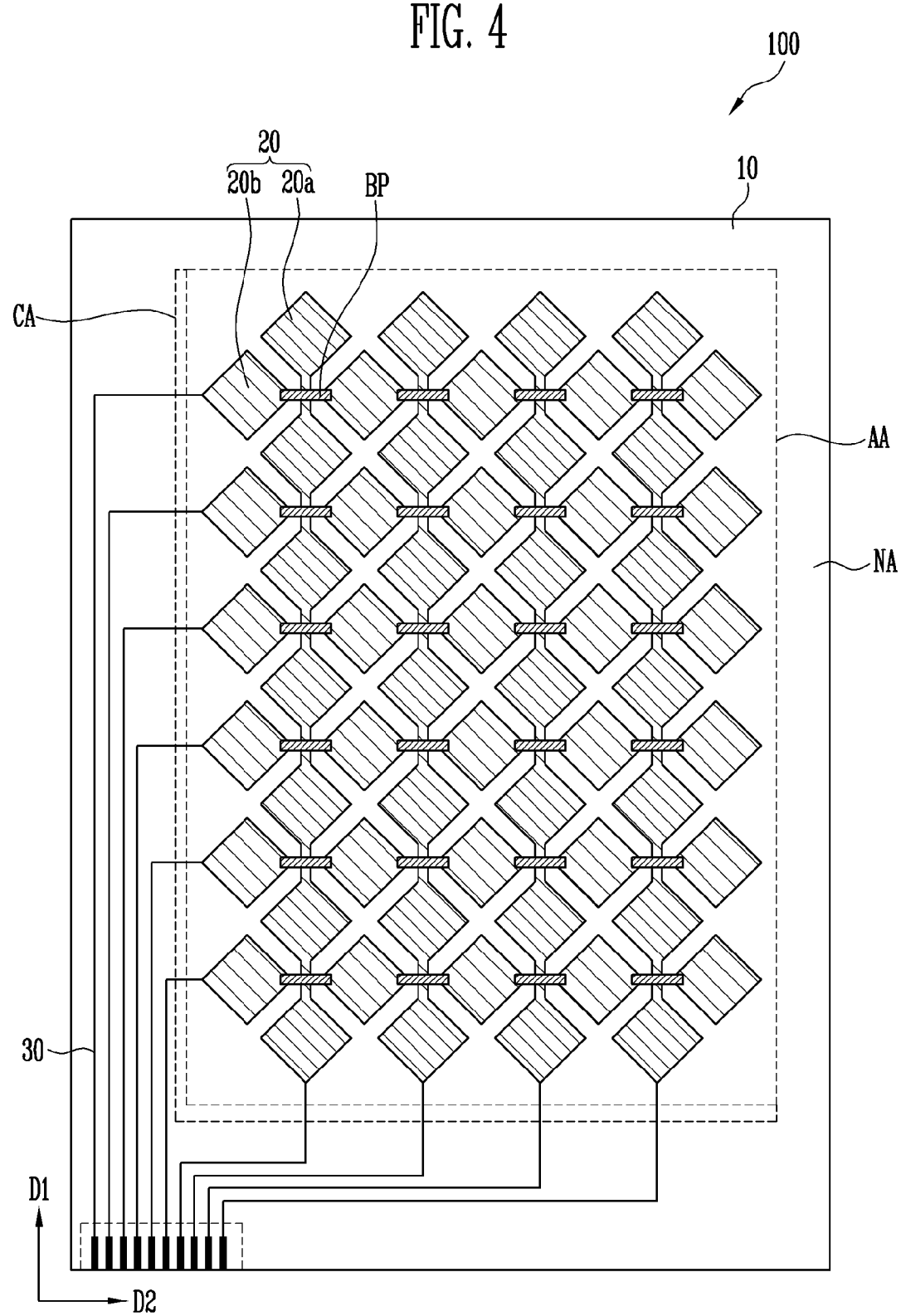
FIG. 4 is a plan view of a touch screen panel according to an exemplary embodiment.
Figure 5:
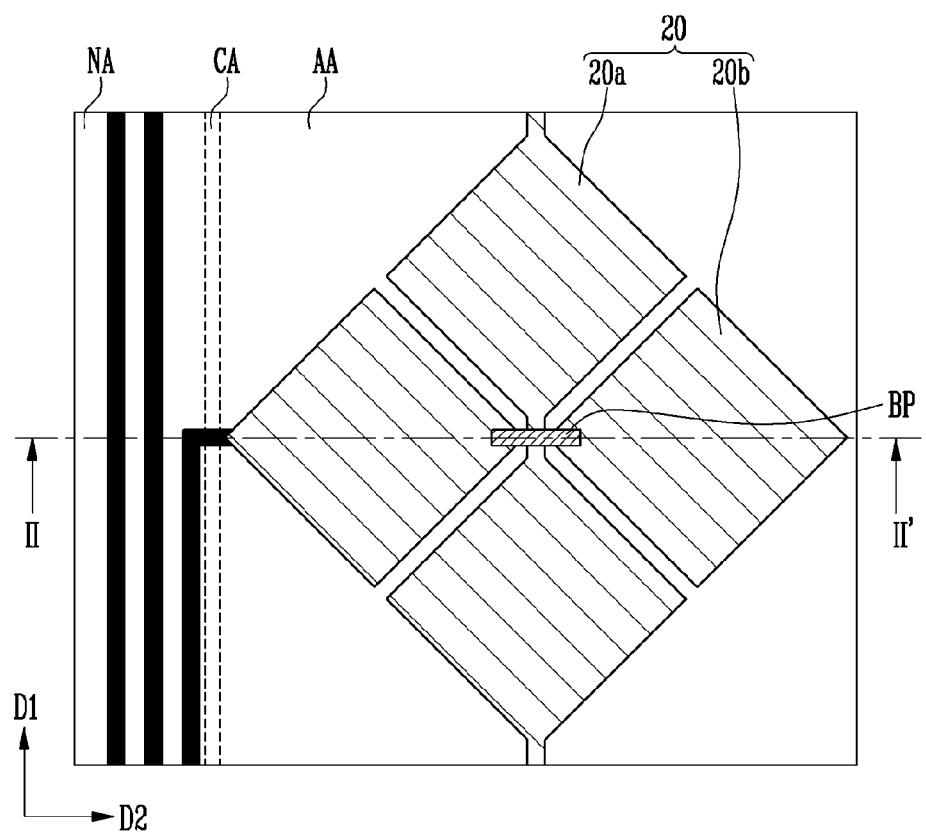
FIG. 5 is a partially enlarged plan view of the touch screen panel of FIG. 4.
Figure 6:
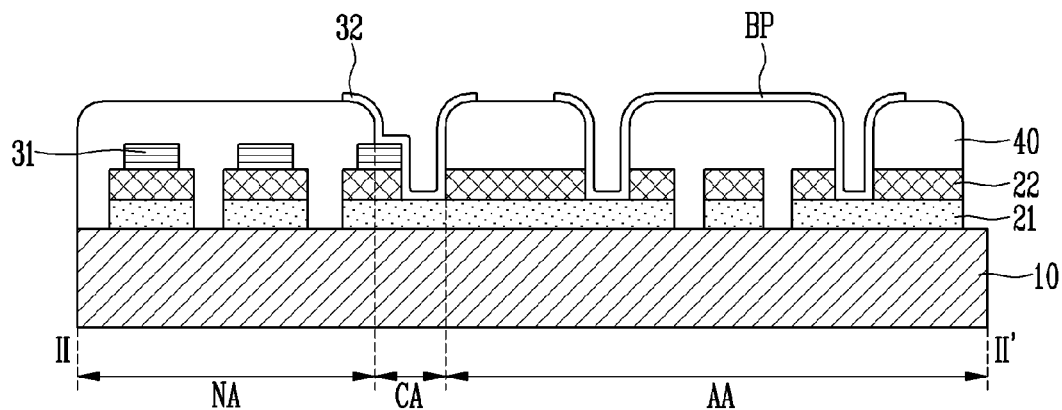
FIG. 6 is a sectional view taken along line I-I' in FIG. 5.

FIG. 4 is a plan view of a touch screen panel according to an exemplary embodiment. FIG. 5 is a partially enlarged plan view of the touch screen panel of FIG. 4. FIG. 6 is a sectional view taken along line I-I' in FIG. 5. FIG. 7A, FIG. 7B, FIG. 7C, FIG. 7D, and FIG. 7E are a process view illustrating a manufacturing process of the touch screen panel of FIG. 4.

In FIGS. 4 to 7E, components having the same reference numerals as those of the touch screen panel illustrated with reference to FIGS. 1 to 3E may refer to the aforementioned disclosure, and thus, duplicative description thereof will be omitted.

Sensing electrodes 20 according to the present exemplary embodiment includes first sensing electrodes 20a and second sensing electrodes 20b. The first sensing electrodes 20a and the second sensing electrodes 20b are alternately arranged, respectively, so as to be connected along different directions from each other. The first sensing electrodes 20a may be connected with each other along a column direction D1 (vertical direction), and column lines of the first sensing electrodes 20a may be connected to connecting lines 30, respectively. The second sensing electrodes 20b may be connected with each other along a row direction D2 (horizontal direction), and row lines of the second sensing electrodes 20b may be connected to connecting lines 30, respectively. The adjacent second sensing electrodes 20b may be electrically connected to each other by a bridge pattern BP.

Figure 7A:
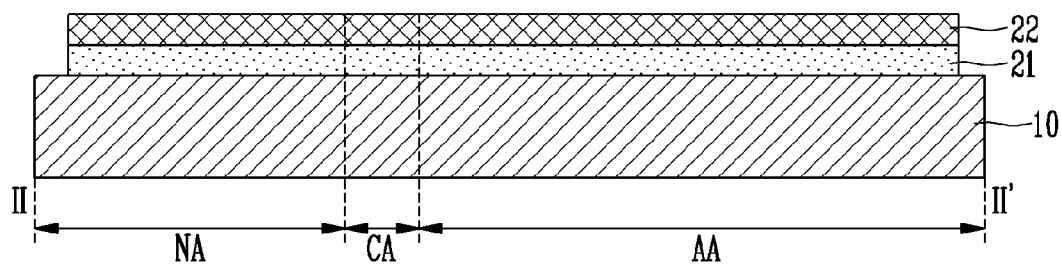
FIG. 7A, FIG. 7B, FIG. 7C, FIG. 7D, and FIG. 7E are a process view illustrating a manufacturing process of the touch screen panel of FIG. 4.
Figure 7B:
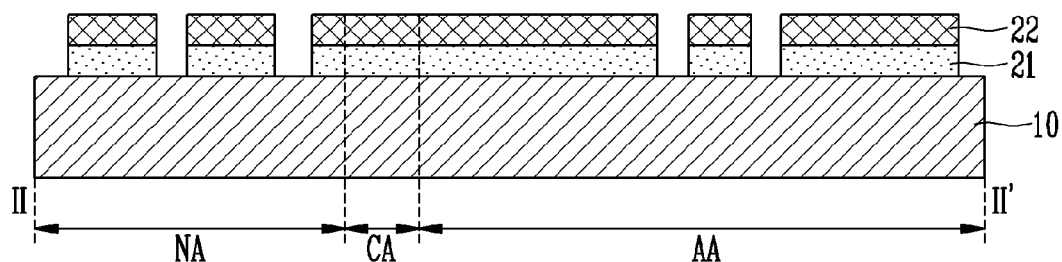

Referring to FIGS. 7A and 7B, the sensing electrodes 20 are formed by forming a first overcoating layer 21 on a substrate 10 by using a conductive material, forming a second overcoating layer 22 on the first overcoating layer 21 by using an insulating material, and then patterning the first and second overcoating layers 21 and 22 through wet or dry etching.

A metal nanowire, such as a silver nanowire (AgNW), may be used as the conductive material of the first overcoating layer 21. The thickness of the first overcoating layer 21 may have a normal range in the art. An acrylic- or silicone-based monomer may be used as the insulating material of the second overcoating layer 22, and the thickness of the second overcoating layer 22 may be in a range of about 50 nm to about 5 µm. The second overcoating layer 22 may be capped in an active area AA, thereby improving reliability.

Each of the sensing electrodes 20 according to the present exemplary embodiment may have a diamond shape. However, the shape, material, and structure of the sensing electrode 20 may vary.

The connecting lines 30 may connect the first sensing electrodes 20a and the second sensing electrodes 20b in units of lines to an external driving circuit (not shown). For example, the connecting lines 30 may be electrically connected to the column lines of the first sensing electrodes 20a and the row lines of the second sensing electrodes 20b, respectively, to connect the first and second sensing electrodes 20a and 20b to an external driving circuit, such as a position detecting circuit, through a pad portion (not shown). The connecting lines 30 are arranged in a non-active area NA outside the touch screen panel 100, to avoid overlapping the active area AA.

The connecting lines 30 in the non-active area NA include a first overcoating layer 21 disposed on the substrate 10 as a conductor layer, a second overcoating layer 22 formed of an insulating material on the first overcoating layer 21, and a metal line layer 31 on the second overcoating layer 22.

Referring to FIGS. 7A and 7B, the first overcoating layer 21 and the second overcoating layer 22 of the connecting lines 30 in the non-active area NA are deposited and patterned through the same process as the first overcoating layer 21 and the second overcoating layer 22 in the active area AA. Thus, the first overcoating layer 21 and the second overcoating layer 22 in the non-active area NA are patterned as the connecting lines 30.

Figure 7C:
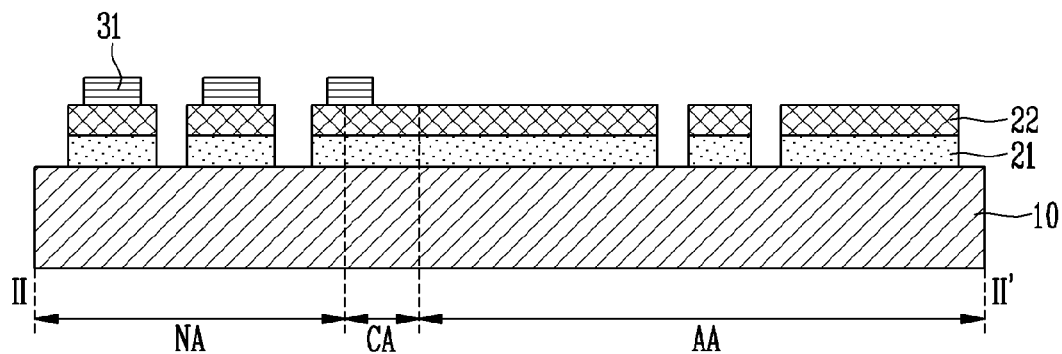

Referring to FIG. 7C, the metal line layer 31 is then formed on the second overcoating layer 22 and then patterned through dry etching, thereby forming the connecting lines 30.

Figure 7D:
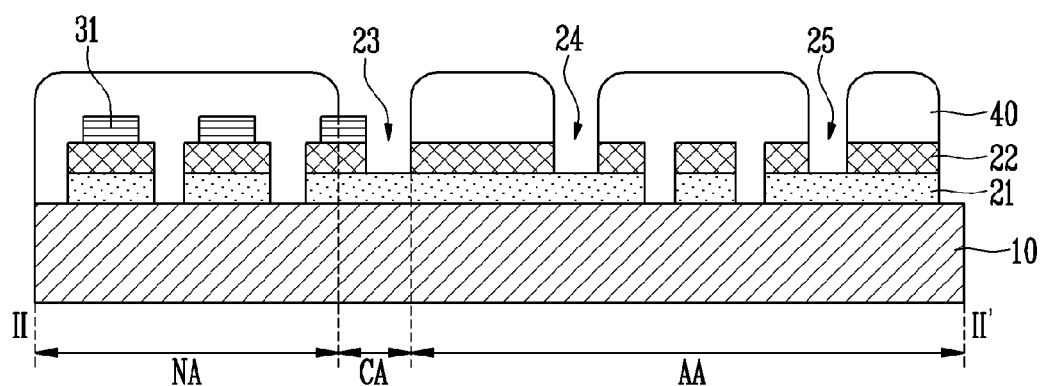

Referring to FIG. 7D, an organic layer 40 is then disposed on the second overcoating layer 22 of the sensing electrodes 20 in the active area AA and the metal line layer 31 of the connecting lines 30 in the non-active area NA. The organic layer 40 and the second overcoating layer 22 are etched in a contact area between the active area AA and the non-active area NA, thereby forming a contact hole 23.

Figure 7E:
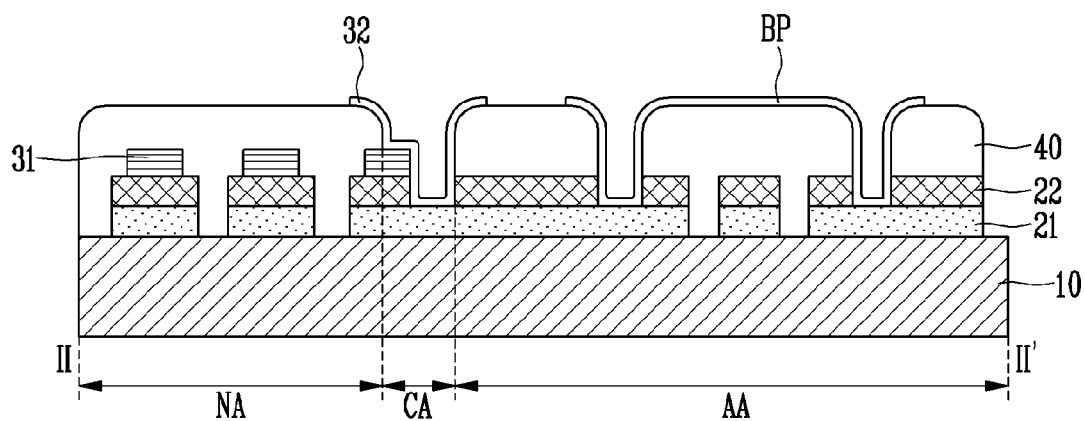

Referring to FIG. 7E, a metal capping layer 32 is then disposed in the contact hole 23. In the touch screen panel 100 according to the present exemplary embodiment, the first sensing electrodes 20a and the second sensing electrodes 20b are formed in the same layer, and the sensing electrode 20 includes bridge patterns BP electrically connecting two adjacent second sensing electrodes 20b to each other. Similarly to the process of forming the metal capping layer 32 in the contact hole 23, the bridge pattern BP may be formed by forming holes 24 and 25 by etching the organic layer 40 and the second overcoating layer 22 at both end portions, where the bridge pattern BP is to be positioned, and then forming the metal capping layer 32 over the organic layer 40 corresponding to the bridge pattern BP.

The organic layer 40 may be disposed between the first sensing electrode 20a and the bridge pattern BP and insulate the first sensing electrode 20a from the bridge pattern BP.

The bridge pattern BP may be formed of a transparent electrode material or an opaque low-resistance metal material. The width, thickness, or length of the bridge pattern BP may be adjusted to prevent the bridge pattern BP from being visualized from outside. According to an exemplary embodiment, the bridge pattern BP may be inclined in a diagonal direction such that the visualization of the bridge pattern BP from outside may further be prevented.

The metal capping layer 32 may have a thickness of about 500 Å or more, more particularly, a thickness of about 500 Å to 700 Å, by using indium tin oxide (ITO) or titanium (Ti) based corrosion resistance alloy.

Figure 8:
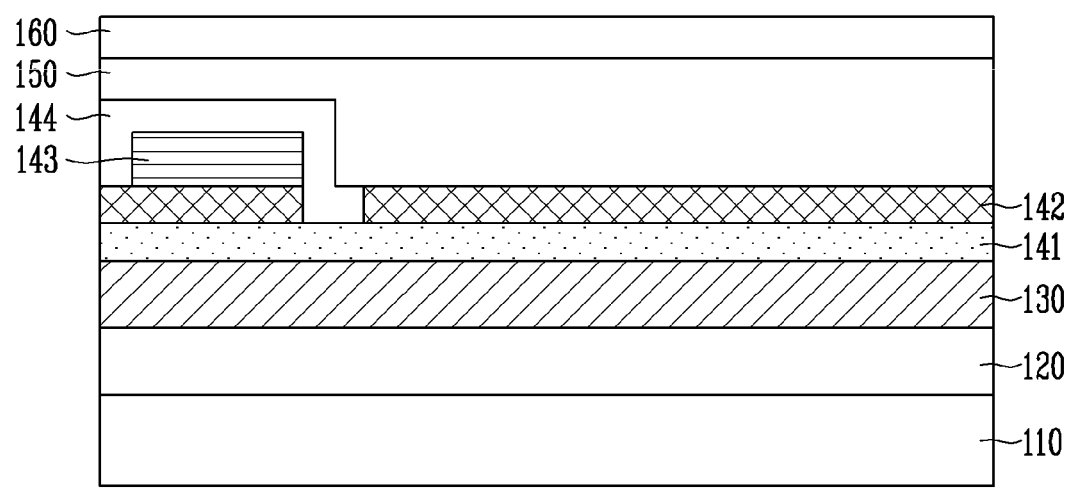
FIG. 8 is a sectional view illustrating a display device to which a touch screen panel according to an exemplary embodiment is applied.

The touch screen panel 100 according to an exemplary embodiment may be applied to various display devices. FIG. 8 illustrates a section of a display device to which a touch screen panel according to an exemplary embodiment is applied.

Referring to FIG. 8, the display device has a structure including a display layer 120 formed on a thin-film transistor (TFT) backplane 110, an encapsulation substrate 130 formed on the display layer 120, sensing electrodes formed with a first overcoating layer 141 and a second overcoating layer 142 on the encapsulation substrate 130, and connecting lines formed with a first overcoating layer 141, a second overcoating layer 142, a metal line layer 143, and a metal capping layer 144 on the encapsulation substrate 130. A cover substrate 160 is adhered on the structure through an optical transparent adhesive 150.

The display layer 120 may be an organic light emitting layer or a liquid crystal layer. When the display layer 120 includes an organic light emitting layer, the degree of light emission may be changed based on a current from the backplane 110. Accordingly, luminance of an image displayed to a user may be changed depending on a light emitting degree of the organic light emitting layer. When the display layer 120 includes a liquid crystal layer, the arrangement of liquid crystals may be changed by a voltage from the TFT backplane 110. Accordingly, the polarization degree of light generated from a backlight (not shown) and penetrated through a polarizing plate (not shown) may be changed depending on an arrangement of the liquid crystals. When the light having the changed polarization degree reaches a user via another polarizing plate (not shown), the luminance of an image displayed to the user may be changed.

In addition, the touch screen panel according to an exemplary embodiment may be applied to an in-cell structure. In this case, the touch screen panel may further include an organic light emitting layer and a thin film encapsulation layer.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A touch screen panel, comprising:
  a substrate comprising:
    an active area,
    a non-active area outside the active area, and
    a contact area between the active area and the non-active area;
  sensing electrodes disposed in the active area;
  a connecting line disposed in the non-active area and the contact area, the connecting line being electrically connected to a sensing electrode among the sensing electrodes; and
  a metal capping layer disposed in the contact area,
  wherein the sensing electrodes comprise:
    a first overcoating layer disposed on the substrate as a conductor layer, and a second overcoating layer disposed on the first overcoating layer, wherein the connecting line comprises:
the first overcoating layer;
the second overcoating layer; and
a metal line layer disposed on the second overcoating layer, the second overcoating layer being disposed, in a direction normal to a surface of the substrate, between the metal line layer and the first overcoating layer, and wherein the metal capping layer couples the metal line layer to the first overcoating layer through a contact hole in the second overcoating layer, the contact hole exposing the first overcoating layer in the contact area.

2. The touch screen panel of claim 1, wherein:
the connecting line is one of a plurality of connecting lines; and
each connecting line among the connecting lines is respectively connected to a different sensing electrode among the sensing electrodes.

3. The touch screen panel of claim 1, wherein the sensing electrodes comprise:
first sensing electrodes disposed in a first direction;
second sensing electrodes disposed in a second direction intersecting the first direction; and
bridge patterns electrically connecting two adjacent first sensing electrodes.

4. The touch screen panel of claim 1, further comprising an organic layer disposed on the second overcoating layer in the active area and the metal line layer in the non-active area.

5. The touch screen panel of claim 2, wherein the metal capping layer is further disposed on the metal line layer that corresponds to a pad portion.

6. The touch screen panel of claim 3, wherein the bridge patterns comprise the metal capping layer disposed on the first overcoating layer.

7. The touch screen panel of claim 1, wherein the first overcoating layer comprises a metal nanowire layer.

8. The touch screen panel of claim 1, wherein:
the second overcoating layer comprises an acrylic-based or silicone-based monomer; and
the thickness of the second overcoating layer is in a range of about 50 nm to about 5 μm.

9. The touch screen panel of claim 1, wherein the metal line layer comprises copper or aluminum.

10. The touch screen panel of claim 1, wherein:
the metal capping layer comprises an indium tin oxide (ITO) or titanium (Ti) based corrosion resistance alloy; and
the thickness of the metal capping layer is substantially equal to or greater than about 500 Å.

11. The touch screen panel of claim 1, further comprising a thin-film transistor (TFT) backplane,
wherein the substrate is disposed on the TFT backplane.

* * * * *